United States Patent Office 3,592,869
Patented July 13, 1971

3,592,869
OLEFIN OLIGOMERIZATION
Lawrence G. Cannell, Berkeley, Calif., assignor to
Shell Oil Company, New York, N.Y.
No Drawing. Filed Oct. 3, 1968, Ser. No. 764,910
Int. Cl. C07c 3/10
U.S. Cl. 260—683.15D                           10 Claims

ABSTRACT OF THE DISCLOSURE

Olefins are oligomerized with a heterogeneous catalyst composition produced by (1) contacting a nickel compound and an alkyl aluminum compound in the presence of an olefinic compound and (2) subsequently contacting the resulting nickel-containing solution with an inorganic refractory oxide support.

BACKGROUND OF THE INVENTION

A variety of oligomerization catalysts, both homogeneous and heterogeneous, has been employed to convert, i.e., oligomerize, lower olefins to olefinic products of higher molecular weight, e.g., to dimer, trimer, tetramer or the like. One homogeneous oligomerization process is that of Belgian Patent No. 640,535, issued Nov. 28, 1963, to Shell Internationale Mattschappij, N.V., which employs a homogeneous oligomerization catalyst prepared from hydrocarbon-soluble nickel salts and an alkyl aluminum halide. The use of soluble transition metal halide systems to catalyze olefin polymerization to high-molecular-weight products, e.g., polyethylene or polypropylene, is well documented in the field of what is known as "Ziegler-Natta chemistry." Although utilization of homogeneous catalysts affords useful product mixtures, the catalysts are relatively unstable upon attempted storage and must be prepared in situ immediately prior to use.

A heterogeneous oligomerization process is that of Magoon et al., U.S. Ser. No. 671,139, filed Sept. 27, 1967, now U.S. Pat. No. 3,483,269, which employs as catalysts certain π-allyl transition metal halides supported upon an acidic inorganic oxide support. Although the heterogeneous catalysts of this process are characterized by greater stability during production, storage and utilization, the π-allyl transition metal halide precursors required for preparation of the catalyst are expensive and often not commercially available. It would be of advantage, therefore, to prepare stable, highly active heterogeneous oligomerization catalyst compositions from more readily available, less expensive metal compounds.

SUMMARY OF THE INVENTION

It has now been found that an improved process of oligomerizing olefins is afforded by employing a heterogeneous catalyst composition produced by (1) contacting a divalent nickel compound and an alkyl aluminum compound in the presence of an olefinic compound, (2) subsequently contacting the resulting nickel-containing solution with an inorganic refractory oxide support and (3) separating the resulting heterogeneous catalyst composition. The heterogeneous catalyst compositions are characterized by improved stability during production, storage and utilization, while retaining a high level of catalyst activity.

DESCRIPTION OF PREFERRED EMBODIMENTS

The olefin reactant

The olefin oligomerization process is broadly applicable to the oligomerization of monolefins of 2 or more carbon atoms having terminal or internal ethylenic unsaturation. Preferred olefins are straight-chain hydrocarbon monoolefins of from 2 to 10 carbon atoms as illustrated by ethylene, propylene, 1-butene, 2-butene, 1-pentene, 1-hexene, 1-octene and 3-octene. In general, terminal olefins, i.e., α-olefins, are preferred over analogous internal olefins and particularly preferred are the straight-chain or normal α-olefins of from 2 to 5 carbon atoms, i.e., ethylene, propylene, 1-butene and 1pentene. Also suitably employed are mixtures of two or more fo the above olefins, wherein the resulting process is one of co-oligomerization, which term is embraced by the generic term "oligomerization" as employed herein. Such co-oligomerization is inherent, of course, in any process involving production of trimer. In the preferred modification, however, the oligomerization process employs a feed consisting essentially of a single olefinic reactant.

The catalyst composition

The precise chemical form of the catalyst composition is not known with certainty and the catalyst composition is best defined in terms of its method of production. The catalyst composition results from (1) the intimate contacting of a divalent nickel compound and an alkyl aluminum compound in the presence of an olefinic compound, and (2) subsequently reacting the resulting nickel-containing solution with an inorganic, refractory oxide support.

In general, any anhydrous nickel compound can be employed for preparing the catalyst composition of the invention provided the nickel compound is sufficiently soluble in the inert liquid diluent in which the nickel salt is contacted with the alkyl aluminum compound and the olefinic compound or in a solution of the alkyl aluminum compound, the olefinic compound and the inert diluent. Inert diluents employed for contacting of the nickel salt are defined below. In most instances, a nickel salt with a solubility in the inert liquid diluent of at least 0.2 grams of nickel salt per 100 grams of inert diluent is satisfactoy although a solubility of at least 0.4 gram of nickel salt on the same basis is preferred.

Suitable anyhdrous nickel compounds include inorganic as well as organic divalent nickel compounds. Illustrative inorganic divalent nickel compounds are nickel halides such as nickel chloride, nickel bromide and nickel iodide.

One class of suitable organic divalent nickel compounds are nickel salts of carboxylic salts, e.g., nickel alkanoates of up to 10 carbon atoms, preferably of up to 6 carbon atoms, such as nickel formate, nickel acetate, nickel propionate, nickel butyrate, nickel hexanoate and the like.

Other suitable organic divalent nickel compounds are nickel β-diketone monoenolate salts represented by Formula I

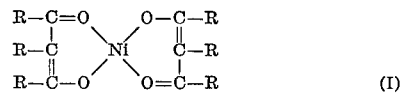

(I)

wherein R independently is hydrogen, alkyl or aryl of up to 10 carbon atoms, or haloalkyl or haloaryl of up to 10 carbon atoms and wherein the dotted lines represent interaction between the unshared electron pairs of the oxygen and the vacant electron orbitals of the nickel. The nickel salt represented by Formula I preferably has up to 20 carbon atoms and up to 12 halogen substituents. The halogen substituents are suitably fluorine, chlorine, bromine or iodine, but preferred halogen substituents are fluorine, or chlorine. Illustrative of suitable nickel salts of Formula I are bis(2,4-pentandionato)nickel(II) salts, more commonly referred to as nickel acetylacetonates, such as bis(2,4-pentandionato)-nickel(II), bis(1,1,1-trifluoro-2,4-pentandionato)nickel(II), bis(1,1,1-trichloro-2,4-pentandionato)nickel(II), bis(1,1,1,trifluoro-3-ethyl-2,4-pentandionato)nickel(II), and bis(1,1,1,5,5,5-hexafluoro-2,4-pentandionato)nickel(II).

Another class of suitable organic divalent nickel compounds includes nickel phosphine halide chelates represented by Formula II $$(PR'_3)_2NiX_2 \quad (II)$$

wherein X is halogen, preferably chlorine or bromine, and R' independently is an aromatic moiety of up to 20 carbon atoms attached directly to phosphorus. R' is suitably hydrocarbon aromatic containing only atoms of carbon and hydrogen or is substituted-hydrocarbon aromatic additionally containing atoms of halogen as substituents on aromatic ring carbon atoms or atoms of oxygen incorporated in functional groups such as alkoxy, aryloxy or carbalkoxy. Preferred R' groups are hydrocarbon aromatic, i.e., aryl or alkaryl, as illustrated by phenyl, naphthyl, p-phenylphenyl, tolyl, xylyl, p-ethylphenyl, 2,4-dipropylphenyl, 4-tert-butylnaphthyl and 2,4,6-trimethylphenyl. Illustrative phosphine nickel chelates of Formula II therefore include bis(triphenylphosphine)nickel(II) dibromide, bis(tritolylphosphine)nickel(II) dichloride, bis(naphthyldiphenylphospine)nickel(II) dibromide, bis-[tris(p - methoxyphenyl)phosphine]nickel(II) dichloride, and bis[tris(p-phenoxyphenyl)phosphine]nickel(II) dibromide.

Nickel halides, nickel alkanoates and nickel β-diketone monoenolates, especially bis(2,4-pentandionato)nickel (II) salts, in part because of their availability and solubility in inert diluents, are preferred nickel salts.

Alkyl aluminum compounds are an essential component of the catalyst composition. Although alkyl aluminum compounds such as trialkyl aluminum compounds and alkyl aluminum alkoxides, e.g., alkyl aluminum dialkoxides and dialkyl aluminum alkoxides, are in part operable, alkyl aluminum halides are preferred. Suitable alkyl aluminum compounds include alkyl aluminum sesquihalides represented by Formula III and alkyl aluminum halides represented by Formula IV $$R''_3Al_2X_3 \quad (III)$$

$$R''_nAlX_{(3-n)} \quad (IV)$$

wherein R'' is alkyl of up to 8 carbon atoms, preferably of up to 4, X is halogen, preferably chlorine or bromine, and $n$ is 1 or 2. Illustrative of alkyl aluminum sesquihalides of Formula I are ethylaluminum sesquichloride and ethylaluminum sesquibromide. Illustrative of alkyl aluminum halides of Formula II are alkyl aluminum dihalides such as ethylaluminum dichloride, ethylaluminum dibromide, propylaluminum dichloride and butylaluminum dichloride and dialkyl aluminum halides such as diethylaluminum chloride, dipropylaluminum bromide, and dioctylaluminum chloride.

The ratio of alkyl aluminum compounds to nickel salt used to form the catalyst composition will in part depend upon the type of alkyl aluminum compound employed. It will be understood that dialkyl aluminum halides supply two moles of alkyl-aluminum bond per mole of aluminum, whereas alkyl aluminum dihalides supply one mole of alkyl-aluminum bond per mole of aluminum, and alkyl aluminum sesquihalides supply one and one-half moles of alkyl-aluminum bond per mole of aluminum. The quantity of the alkyl aluminum compound is selected so that the ratio of moles of alkyl-aluminum bond provided by the alkyl aluminum compound to moles of nickel salt is from about 2:1 to about 20:1, preferably from about 3:1 to about 10:1.

In order to obtain the improved catalyst composition of the process of the invention, it is essential that the nickel compound and the alkyl aluminum compound be contacted in the presence of an olefinic compound in a suitable inert diluent. In general, any hydrocarbon olefinic compound having up to 2 olefinic linkages and having up to 10 carbon atoms is suitably employed as the olefinic precursor for the catalyst composition. One suitable class of olefinic compounds is straight-chain hydrocarbon monoolefins of from 4 to 10 carbon atoms as illustrated by 1-butene, 2-butene, 1-pentene, 1-hexene, 1-octene, and 3-octene. In general, terminal monoolefins, i.e., α-monoolefins, are preferred over analogous internal monoolefins and particularly preferred monoolefins are α-monoolefins of from 4 to 6 carbon atoms. Another class of suitable olefinic compounds are conjugated diolefinic hydrocarbons having up to 10 carbon atoms and represented by the Formula V $$\overset{R'''}{\underset{}{C}}H=\overset{R'''}{\underset{}{C}}H-\overset{R'''}{\underset{}{C}}=CH \quad (V)$$

wherein R''' independently is hydrogen or alkyl of up to 4 carbon atoms such as methyl, ethyl, propyl and butyl, with the proviso that any two R''' groups may together, with the other carbon atoms joining them, form a carbocyclic ring having from 6 to 10 carbon atoms in the ring thereof and containing one or both of the ethylenic linkages depicted in Formula V.

Illustrative of acyclic diolefins of Formula V include butadiene, 1,3-pentadiene, isoprene, 1,3-hexadiene, 2,4-hexadiene, and 2,3-decadiene. Illustrative of monocyclic diolefins of Formula V wherein two R''' groups are joined include 1,3-cyclohexadiene, vinylcyclohexene, 1,3-cycloheptadiene and 1,3-cyclooctadiene. Generally, the preferred conjugated diolefinic hydrocarbons are acyclic straight-chain conjugated diolefins and particularly preferred are acyclic straight-chain diolefins of up to 6 carbon atoms, especially butadiene.

Other suitable olefinic compounds are mixtures of the above monoolefins and conjugated diolefins. When mixtures of monoolefins and conjugated diolefins are employed, the molar ratio of monoolefin to diolefin is not critical. In general, molar ratios of monoolefin to diolefin of from about 10:1 to about 1:1 are satisfactory.

Generally, the olefinic compounds preferably employed for preparing the catalyst composition are conjugated dienes and mixtures of conjugated dienes and monolefins.

The molar ratio of olefinic compound to nickel compound depends in part upon the nickel compound employed for preparing the catalyst composition. In most instances, catalyst compositions prepared from inorganic nickel salts require a greater amount of olefinic compound than organic nickel salts. In general, however, molar ratios of olefinic compound to nickel compound vary from about 1:1 to about 30:1 with molar ratios of from 5:1 to about 15:1 being preferred.

The nickel compound and the alkyl aluminum compound is contacted with the olefinic compound in the presence of an inert diluent which is liquid at reaction temperature and pressure. Illustrative of diluents suitable for contacting the nickel compound, the alkyl aluminum compound and the olefinic compound are acyclic or alicyclic alkanes of from 6 to 10 carbon atoms, e.g., hexane, cyclohexane, heptane, isooctane, and decane; and monocyclic aromatic hydrocarbons of from 6 to 12 carbon atoms, e.g., benzene, toluene and xylene. Preferred inert diluents comprise monocyclic aromatic hydrocarbons.

The temperature at which the nickel compound, the alkyl aluminum compound and the olefinic compound is contacted varies from about −70° C. to about 100° C. although temperatures of from about −30° C. to about 20° C. are preferred. The pressure to be employed is not critical, e.g., pressures from about 1 atmosphere to about 50 atmospheres are satisfactory. The contacting is preferably effected in an inert environment, that is, one essentially free from reactive materials such as water and oxygen.

Subsequent to the contacting of the nickel salt with the alkyl aluminum compound and the olefinic compound, the resulting nickel-containing solution is contacted with the catalyst support. The catalyst support comprises a normally solid, inorganic oxide material containing a major proportion of at least one oxide component selected from silica, alumina and boria. Such materials are known as refractory oxides and include synthetic compositions as well as acid-treated clays and similar materials or crystalline aluminosilicates known in the art as molecular sieves. Synthetic refractory oxides are preferred over naturally occurring materials or molecular sieves and exemplary synthetic refractory oxides include silica, silica-alumina, silica-magnesia, silica-zirconia, boria-alumina, silica-alumina-boria, silica-alumina-zirconia, silca-alumina-magnesia and silica-titania-zirconia. Preferred refractory oxide supports are siliceous refractory oxides, that is, refractory oxides containing silica as the major component, and particularly preferred as the siliceous refractory oxide is silica-alumina.

Provided the nickel compound is first contacted simultaneously with both the alkyl aluminum compound and the olefinic compound, the subsequent contacting of the resulting nickel-containing solution with the catalyst support can be conducted in any convenient manner and at any convenient temperature or pressure, e.g., as by contacting the nickel-containing solution with the support for a time sufficient to allow interaction between the nickel species and the support. The contacting is preferably conducted in an inert environment so that the contacting conditions are substantially anhydrous and substantially oxygen-free. Subsequent to contacting, the supported catalyst composition is separated from the diluent by conventional techniques, e.g., filtration and decantation.

The proportion of nickel to be incorporated on the catalyst support is not critical so long as sufficient nickel is present to allow adequate olefin-catalyst contact during the olefin oligomerization process. Amounts of nickel from about 0.01% to about 5% by weight, based on total catalyst composition, are satisfactory with amounts from about 0.1% by weight to about 3% by weight on the same basis being preferred.

No special pretreatment of the catalyst support is required, but better results are obtained if the support has been calcined at temperatures from about 450° C. to about 600° C. for a period of three to six hours prior to the formation of the catalyst composition.

Reaction conditions

The oligomerization process is conducted in a fluid phase, i.e., either in the gaseous or liquid phase, in the presence or in the absence of an inert reaction diluent. When conducted in the vapor phase, inert gaseous diluents such as nitrogen, argon, helium or volatile saturated hydrocarbons, e.g., methane or ethane, are satisfactory. Illustrative liquid-phase reaction diluents include hydrocarbons and halohydrocarbons free from aliphatic carbon-carbon unsaturation such as hexane, octane, decane, cyclohexane, decahydronaphthalene, benzene, toluene, and chlorobenzene. In many modifications of the oligomerization process, a portion of the product suitable serves as reaction diluent and no added reaction diluent is employed. When diluent is utilized, however, amounts up to about four moles of diluent per mole of olefin are satisfactory. The process is suitably conducted in an inert reaction environment so that the presence of reactive materials such as water and oxygen is desirably avoided. Recation conditions are therefore substantially anhydrous and substantially oxygen-free.

The precise method of conducting the oligomerization process is not critical. In one modification, the olefin reactant, the catalyst composition and any diluent which is employed are charged to an autoclave or similar reactor and maintained at reaction conditions for the desired reaction period. In another modification, olefin conversion is effected in a continuous manner as by passing the olefin feed, either in the vapor phase or in a liquid-phase solution, through a reactor in which the heterogeneous catalyst composition is maintained. By any modification, the olefin oligomerization process is conducted at moderate temperatures and pressures. Suitable reaction temperatures vary from about 0° C. to about 130° C., depending in part upon the particular olefin to be converted. The temperature range from about 30° C. to about 80° C. is preferred. The process is conducted at or above atmospheric pressure, and pressures from about 1 atmosphere to about 100 atmospheres are satisfactory. Best results are obtained when a presure of from about 5 atmospheres to about 40 atmospheres is employed.

At the conclusion of the reaction, the product mixture is separated and the product is recovered by conventional means such as fractional distillation, selective extraction, adsorption and the like. Unreacted olefin is suitably recycled for additional conversion.

The products of the oligomerization process are dimers and trimers of the olefin reactant with amounts of tetramer and heavier product being observed on certain occasions, particularly when ethylene is used as the olefin reactant. In general, selectivity to dimed and trimer increases with the molecular weight of the olefin so that utilization of olefin of four or more carbon atoms results in the substantially exclusive production of a dimer and trimed mixture. The product mixture is characterized by a relatively high proportion of branched or iso oligomer product, although some linear, unbranched or normal oligomer is also observed. By way of illustration, oligomerization of propylene leads to a mixture of principally dimer ($C_6$) and trimer ($C_9$) product. The mapor dimer product is methylpentene although n-hexane and dimethylbutene are also produced.

The olefin oligomerization products are materials of established utility and many are chemicals of commerce. The olefins are polymerized to thermoplastic polyolefins as by titanium chloride-aluminum alkyl catalyst systems and are converted by conventional "Oxo" processes to aldehydes of one or more carbon atom which are hydrogenated to corresponding alcohols. Alternatively, such olefins are converted to secondary and tertiary alcohols as by sulfuric acid-catalyzed hydration. The $C_{12}$–$C_{20}$ alcohols thus produced are ethoxylated with ethylene oxide in the presence of a basic catalyst, e.g., sodium hydroxide, to form conventional detergents and the lower molecular weight alcohols are esterified with polyhydric acids, e.g., phthalic acid, to form plasticizers for polyvinyl chloride.

To further illustrate the improved process of the invention, the following examples are provided. It should be understood that the details thereof are not to be regarded as limitations, as they may be varied as will be understood by one skilled in the art.

Example I.—To a stirred solution of 2.0 g. (8.0 mmoles) anhydrous nickel acetylacetonate in 70 ml. toluene and 10 ml. 1-pentene was added, at 0° C., 32 mmoles 1,3 butadiene, followed by 15 mmoles ethylaluminum sesquichloride (30 mmoles of Al) in a small amount of heptane under nitrogen. On the addition of the ethylaluminum sesquichloride, the color of the solution changed from green to amber with accompanying formation of a black precipitate. The nickel-containing solution, after separating from the precipitate by decanting and filtration, was passed through 9.0 g. of commercial silica-alumina (75% $SiO_2$/25% $Al_2O_3$, surface area 506 m.$^2$/g.) placed in a chromatographic column. Prior to use, the silica-alumina had been calcined in air at 550° C. for two hours and cooled in a stream of nitrogen. The resulting supported catalyst was washed in place with toluene and pentane and vacuum-dried. Analysis of the top one-third of solid in the chromatographic column showed 1% wt. nickel; the bottom two-thirds contained a somewhat lesser amount of nickel.

The supported catalyst composition was employed for the oligomerization of 2-butene in a vertical tube flow reactor wherein agitation of the catalyst bed (5.0 g.) was provided by a dasher and an upward flow of feed and products. The 2-butene was continuously fed to the reactor maintained at the pressure and temperature indicated below in Table I. The addition rate of 2-butene was measured in terms of Weight Hourly Space Velocity (WHSV), which relates to the weight of catalyst as a function of time and has units of reciprocal hours. The reaction conditions and results are provided in Table I.

TABLE I

| | |
|---|---|
| Reaction time, days | 11.5 |
| Temperature, °C. | 72–73 |
| Pressure, p.s.i.g. | 145–170 |
| Butene-2: | |
|   Amount, g. | 7971 |
|   WHSV | 2.7–9.8 |
|   Conversion, percent | 47 |
| Products, percent wt.: | |
|   $C_8$ | 89 |
|   $C_{12}$ | 10 |
|   $C_{16}$ | 1 |
| $C_8$ composition, percent wt.: | |
|   3-methylheptenes | 64 |
|   3,4-dimethylhexenes | 25 |
|   n-Octenes | 11 |
| Grams of product/mmole of Ni | 4420 |

Example II.—A supported catalyst (0.62% w. nickel) was obtained by contacting commercial 9.0 g. silica gel with a nickel-containing solution prepared from the reaction of 8.0 mmoles nickel acetylacetonate in 70 ml. toluene and 10 ml. 1-pentene with 32 mmoles 1,3-butadiene and 15 mmoles ethylaluminum sesquichloride. The silica gel had a surface area of 307 m.²/g. and had been calcined at 550° C. for two hours followed by cooling under nitrogen. This catalyst was used for propylene oligomerization in a stirred 84 ml. autoclave wherein 20 ml. n-heptane was initially present. The reaction conditions and results are provided in Table II.

TABLE II

| | |
|---|---|
| Catalyst | 1.0 |
| Propylene: | |
|   Amount, g. | 277 |
|   WHSV | 55 |
|   Conversion, percent | 95 |
| Reaction conditions: | |
|   Pressure, p.s.i.g. | 300 |
|   Time, hr. | 4.9 |
|   Temperature, °C. | 70–80 |
| Products, percent wt.: | |
|   $C_6$ | 62.4 |
|   $C_9$ | 25 |
|   $C_{12}$ | 5 |
|   $C_{15}$ and higher | 2.6 |
| $C_6$ composition, percent wt.: | |
|   2-methylpentenes | 69 |
|   2,3-dimethylbutenes | 6 |
|   Hexenes | 25 |

Example III.—To a mixture of 8.0 mmoles (1.42 g.) anhydrous nickel acetate in 70 ml. toluene, 10 ml. 1-pentene and 32 mmoles butadiene was added with stirring at 0° C. 15 mmoles of ethylaluminum sesquichloride as a 25% w. solution in heptane. The nickel-containing solution was separated from a precipitate present and passed over 9.0 g. of silica-alumina held in a chromatographic column. The resulting solid was washed with toluene and pentane and dried. Analysis showed the top third of the solid contained 0.55% w. nickel with the remaining solid having somewhat less nickel.

The supported catalyst composition was employed for the oligomerization of ethylene by a procedure similar to Example II. The reaction conditions and results are provided in Table III.

TABLE III

| | |
|---|---|
| Catalyst composition, g. (0.55% Ni) | 2 |
| Reaction conditions: | |
|   Pressure, p.s.i.g. | 200 |
|   Temperature, °C. | 74–78 |
|   Time, hr. | 8.5 |

TABLE III—Continued

| | |
|---|---|
| 1-butene: | |
|   Amount, g. | 204 |
|   WHSV | 12 |
|   Conversion, percent | 77 |
| Products, percent wt.: | |
|   $C_8$ | 91 |
|   $C_{12}$ | 7.5 |
|   $C_{16}$ | 1.5 |
| $C_8$ composition, percent wt.: | |
|   3-methylheptene | 54 |
|   3,4-dimethylhexenes | 28 |
|   n-Octenes | 18 |

Example IV.—(A) To a solution of bis(triphenylphosphine)nickel(II) dibromide (0.8 g., 1.0 mmole) and 0.3 g. triphenylphosphine dissolved in 70 ml. toluene and 10 ml. 1-pentene was added at 0° C. with stirring 7.5 mmoles $(CH_3)_3Al_2Cl_3$ to give after filtration a nickel-containing solution which was contacted with 9.0 g. silica-alumina by a procedure similar to that of Example 1. The resulting supported catalyst was found to have 0.9% nickel by weight.

(B) To a mixture of anhydrous nickel chloride (2.0 g.) with 70 ml. toluene and 10 ml. 1-pentene maintained at 0° C. was added with stirring 16 mmoles triethylaluminum followed by 32 mmoles butadiene and 8 mmoles ethylaluminum dichloride. The nickel-containing solution obtained after filtration under nitrogen was used in treating 9.0 g. of silica-alumina as in Example I. The resulting catalyst composition showed by analysis about 0.1% weight nickel.

(C) The catalyst compositions of Example IV(A) and IV(B) were employed for the oligomerization of ethylene in a batch reactor. The reaction conditions and results are provided in Table IV.

TABLE IV

| Nickel salt used in preparing catalyst | $[(C_6H_5)_3P]_2NiBr_2$ | $NiCl_2$ |
|---|---|---|
| Weight catalyst, g. | 1 | 2 |
| Ethylene: | | |
|   Amount, g. | 15 | 17 |
|   Conversion, percent | 90 | 95 |
| Reaction conditions: | | |
|   Temperature, °C. | 14–80 | 10–42 |
|   n-Heptane diluent, ml. | 20 | 20 |
|   Pressure, p.s.i.g. (max.) | 612 | 316 |
|   Time, hr. | 0.67 | 1.67 |
| Products, percent wt.: | | |
|   $C_4$ | 15 | 62.4 |
|   $C_6$ | 36 | 27.9 |
|   $C_8$ | 43 | 5.4 |
|   $C_{10}$ | 4 | 1.3 |
|   $C_{12}$ | 2 | 3.0 |
| Straight-chain content, percent: | | |
|   $C_6$ | 24 | 74 |
|   $C_8$ | 10 | 51 |
|   $C_{10}$ | 7 | 4 |

Example V.—A supported catalyst (0.6% weight nickel) was obtained by contacting 9.0 g. commercial silica-alumina at 0° C. with a nickel-containing solution prepared from the reaction of 8.0 mmoles nickel acetylacetonate in 70 ml. toluene and 10 ml. 1-pentene with 15 mmoles ethylaluminum sesquichloride by a procedure similar to that of Example I.

The supported composition was employed for oligomerization of ethylene by charging a 1-gram sample of the composition, 20 ml. of n-heptane and 19 grams of ethylene to an autoclave. The reaction conditions and results obtained are provided in Table V.

TABLE V

| | |
|---|---|
| Reaction conditions: | |
|   Pressure, p.s.i.g. (max.) | 700–800 |
|   Temperature, | 56–62 |
|   Time, hr. | 0.5 |
| Ethylene conversion | 98 |
| Products, percent wt.: | |
|   $C_4$ | 54 |
|   $C_6$ | 33 |

TABLE V—Continued

Products, percent wt.:
- $C_8$ —————————————————————— 10
- $C_{10}$ ————————————————————— 2.3
- $C_{12}$ ————————————————————— 0.7

Straight-chain content, percent:
- $C_6$ —————————————————————— 65
- $C_8$ —————————————————————— 44
- $C_{10}$ ————————————————————— 21
- $C_{12}$ ————————————————————— 9

Example VI.—Nickel acetylacetonate (2.06 g., 8.0 mmoles) and 9.0 g. of silica-alumina were weighed into a reactor flask under nitrogen. Addition of 70 ml. toluene with stirring brought the nickel acetylacetonate into solution. After addition of 10 ml. 1-pentene, 32 mmoles butadiene was added at 0° C. followed by 15 mmoles ethylaluminum sesquichloride as a 25% w. solution in heptane. The solid silica-alumina was stirred with the reactants for 30 minutes at 0° C. and then separated by filtration under nitrogen, washed with 50 ml. toluene and 10 ml. pentane to give 10.07 g. of a dark brown supported composition after vacuum-drying.

The supported composition was employed for ethylene oligomerization in a flow system by a procedure similar to that of Example I. The reaction conditions and results obtained are provided in Table VI. The reaction was terminated after 40 minutes because the supported composition gradually declined in catalytic activity.

TABLE VI

Temperature, ° C. ———————————————— 30–75
Pressure, p.s.i.g. —————————————————— 100
Ethylene:
- Amount, g. ——————————————————— 34
- Feed rate, g./min. ———————————————— 0.5–1.2
- Conversion, percent ——————————————— 18

Products, percent wt.:
- $C_4$ —————————————————————— 66
- Higher oligomers ————————————————— 34

I claim as my invention:

1. The process of oligomerizing olefins by intimately contacting hydrocarbon monoolefin reactant of from 2 to 10 carbon atoms at a temperature of about −0° C. to about 130° C. and a pressure of from 1 atmosphere to about 100 atmospheres in the presence of a heterogeneous catalyst composition produced by (1) intimately contacting in the liquid phase an anhydrous divalent nickel compound and alkyl aluminum halide of the formulas $$R''_3Al_2X_3 \text{ and } R''_nAlX_{(3-n)}$$

wherein R'' is alkyl of up to 8 carbon atoms, X is chlorine or bromine, and $n$ is a whole number from 1 to 2 inclusive, in the presence of an olefinic catalyst precursor selected from (a) monoolefins of from 4 to 10 carbon atoms, (b) conjugated diolefin of the formula

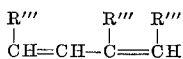

wherein R''' independently is hydrogen or alkyl of up to 4 carbon atoms, with the proviso that any two R''' groups may together with the carbon atoms joining them form a carbocyclic ring having from 6 to 10 carbon atoms in the ring thereof and (c) mixtures thereof, the molar ratio of alkyl aluminum bond to nickel compound being from about 2:1 to about 20:1 and the molar ratio of olefinic catalyst precursor to nickel compound being from 1:1 to about 30:1;

(2) subsequently contacting the resulting nickel species with an inorganic, refractory oxide support.

2. The process of claim 1 wherein the nickel salt is selected from nickel halide, bis(2,4 - pentandionate)nickel(II) of up to 20 carbon atoms and up to 12 halogen substituents, and nickel alkanoate of up to 10 carbon atoms.

3. The process of claim 2 wherein the olefinic catalyst precursor is selected from (a) acyclic straight-chain diolefin of up to 6 carbon atoms and (b) a mixture of acyclic straight-chain diolefin of up to 6 carbon atoms and straight-chain monoolefin.

4. The process of claim 3 wherein the amount of nickel in the catalyst composition is from about 0.01% by weight to about 5% by weight based on total catalyst composition.

5. The process of claim 4 wherein the support is siliceous refractory oxide.

6. The process of claim 5 wherein the alkyl aluminum halide is of the formula $R''_3Al_2X_3$.

7. The process of claim 6 wherein the diolefin is butadiene.

8. The process of claim 7 wherein the monoolefin reactant is a straight-chain olefin of from 2 to 5 carbon atoms.

9. The process of claim 8 wherein the nickel salt is bis(2,4-pentandionato)nickel(II).

10. The process of claim 9 wherein the support is silica-alumina.

References Cited

UNITED STATES PATENTS

| | | | |
|---|---|---|---|
| 3,096,385 | 7/1963 | McConnell et al. | 260—683.15 |
| 3,390,201 | 6/1968 | Drew | 260—676 |
| 3,483,269 | 12/1969 | Magoon et al | 260—683.15 |
| 3,511,891 | 5/1970 | Taylor et al. | 260—683.15 |

PAUL M. COUGHLAN, Jr., Primary Examiner

U.S. Cl. X.R.

252—428, 419A, 430